(12) United States Patent
Jester

(10) Patent No.: US 7,265,183 B2
(45) Date of Patent: Sep. 4, 2007

(54) HIGH CLARITY, LOW FRICTION POLYETHYLENE COMPOSITIONS FOR FILMS

(75) Inventor: Randy D. Jester, Greer, SC (US)

(73) Assignee: Ticona LLC, Florence, KY (US)

( * ) Notice: Subject to any disclaimer, the term of this patent is extended or adjusted under 35 U.S.C. 154(b) by 125 days.

(21) Appl. No.: 10/978,541

(22) Filed: Nov. 1, 2004

(65) Prior Publication Data

US 2006/0093831 A1 May 4, 2006

(51) Int. Cl.
*C08L 23/06* (2006.01)
(52) U.S. Cl. .................. 525/216; 525/191; 525/210; 525/211; 525/242
(58) Field of Classification Search ............. 525/191, 525/210, 211, 216, 242
See application file for complete search history.

(56) References Cited

U.S. PATENT DOCUMENTS

| | | | |
|---|---|---|---|
| H1727 H | 5/1998 | Jones et al. ............ 428/35.7 |
| 5,750,262 A | 5/1998 | Gasse et al. ............ 428/423.5 |
| 5,755,081 A | 5/1998 | Rivett et al. ............ 53/477 |
| 5,783,270 A | 7/1998 | Fischer et al. ............ 428/35.2 |
| 6,008,298 A | 12/1999 | Hatke et al. ............ 525/210 |
| 6,017,616 A * | 1/2000 | Kochem et al. ............ 428/220 |
| 6,068,936 A | 5/2000 | Peiffer et al. ............ 428/500 |
| 6,329,465 B1 | 12/2001 | Takahashi et al. ............ 525/191 |
| 6,383,582 B1 | 5/2002 | Salste et al. ............ 428/34.7 |
| 6,489,016 B2 | 12/2002 | Kishine ............ 428/213 |
| 6,562,907 B2 * | 5/2003 | Johoji et al. ............ 525/191 |
| 6,670,423 B2 | 12/2003 | Hausmann ............ 525/216 |
| 6,696,524 B2 | 2/2004 | Hausmann ............ 525/191 |
| 2002/0055590 A1 | 5/2002 | Ding et al. ............ 525/191 |

FOREIGN PATENT DOCUMENTS

EP 0 566 988 A1 10/1993
WO WO 2004/024433 A2 8/2003

OTHER PUBLICATIONS

Cyclic-olefinic Copolymers as Non-Migrating, Polymeric Slip Additives in LDPE and LLDPE Cast Films by David R. Constant of Ticona LLC 2002 PLACE Conference Proceedings (Conference Papers); Kirk-Othmer, Encyclopedia of Chemical Technology, Fourth Edition (1993), vol. 11, pp. 843-844; and Kirk-Othmer, Encyclopedia of Chemical Technology, Fourth Edition (1993), vol. 10, pp. 775-778.

* cited by examiner

*Primary Examiner*—James J. Seidleck
*Assistant Examiner*—Olga Asinovsky
(74) *Attorney, Agent, or Firm*—Michael W. Ferrell

(57) ABSTRACT

A melt-blended polyethylene/COP composition suitable for making optically clear films with low coefficients of friction includes from about 70 to about 98 weight percent of a polyethylene resin and from about 2 to about 25 weight percent of a first COP resin component, the first COP resin component having a weight average molecular weight of from about 0.5 kg/mol to about 50 kg/mol and being present in an amount effective to increase the relative slip value of films made from the composition as compared with a like film made from the polyethylene resin alone.

21 Claims, 2 Drawing Sheets
(2 of 2 Drawing Sheet(s) Filed in Color)

LDPE FILM

LDPE + 15% HIGH MW COP

LDPE + INVENTION COP LOW MW

HIGH CLARITY, LOW FRICTION POLYETHYLENE COMPOSITIONS FOR FILMS

TECHNICAL FIELD

The present invention is directed to compositions for making optically clear polyethylene films with a cycloolefin polymer as a slip agent melt-blended into the composition. Films made from the composition have low friction surfaces as compared with films made from the polyethylene resin alone and also exhibit haze values comparable to films without slip agents.

BACKGROUND OF THE INVENTION

Melt-blends of polymers are well-known. Cycloolefin containing polymers or COPs have been added to polypropylene resins as seen for example in U.S. Pat. No. 6,068,936 which discloses a polyolefin film which includes at least one layer containing polyolefin and cycloolefin polymer, where the cycloolefin polymer is amorphous and has a mean molecular weight in the range from 200 to 100,000. The blend is further characterized in that the mean molecular weight of the cycloolefin polymer is at most 50% of the mean molecular weight of the polyolefin, and the cycloolefin polymer is a homopolymer or a copolymer containing at most 20% by weight of comonomer. COPs and polyethylene blends are disclosed in U.S. Pat. No. 6,696,542 wherein such blends comprise an ethylene based polymer having a glass transition temperature lower than or equal to 20° C. and a cycloolefin polymer.

U.S. Pat. No. 6,670,423 discloses blends comprising a polar derivative of an ethylene based polymer and a cycloolefin polymer. Additionally, U.S. Pat. No. 6,329,456 discloses an ethylene copolymer composition which comprises an ethylene/α-olefin copolymer and high-pressure radical process low-density polyethylene. PCT 2003/025395 discloses a multi-layer heat film having at least three layers wherein the film has optical clarity, stiffness and low shrinkage in the cross direction. The inner layer, or layers, comprises at least one stiffening polymer selected from the group consisting of: low density polyethylene, linear low density polyethylene, high density polyethylene, blends thereof, polypropylene random copolymer, styrene/butadiene copolymer, polystyrene, ethylene-vinyl acetate copolymer and cyclic-olefin copolymer, provided that when more than one inner layer is present, the inner layers can be the same or different. The skin layers, which also may be the same or different, comprise at least one of: low density polyethylene; a blend of low density polyethylene and linear low density polyethylene; a blend of low density polyethylene and very low density polyethylene; polystyrene; ethylene-vinyl acetate copolymer; a blend of ethylene-vinyl acetate copolymer and linear low density polyethylene; cyclic-olefin copolymer; styrene-butadiene copolymer; or, polypropylene random copolymer, provided that the skin layers are devoid of a homogeneously branched polyethylene resin prepared with a single site catalyst. The films are reported to have haze values of less than about 15%.

Plastic films have widely been employed for prepackaging various products including foods, such as vegetables and the like. See, for example, U.S. Pat. No. 6,489,016 which discloses multilayer packaging films of polyolefin. Also disclosing such packaging materials and packages made therefrom are U.S. Pat. Nos. 6,383,582; 5,750,262; 5,783,270; and 5,755,081; and Statutory Invention Registration No. H1727. Such prepackaging films serve for covering and enclosing commercial articles, such as foodstuffs including liquid foodstuffs, as individual articles or in a lot allotted or subdivided into small portions placed on a plastic carrier tray or the like. The success of such packaging has been attributed to the broad use of thermoplastic heat sealing which is capable of providing the highest degree of package integrity, security and durability. Furthermore, it is required for the prepackaging film that the film is transparent and easily cut, together with practical performance attributes such as resistance to fogging on the inner face when packaged, resistance to break-through and so forth.

Optical properties such as haze and transparency are important issues related to packaging films. It is important for the customer to be able to see through packaging so that the product is well-presented. Another salient attribute of packaging films is their coefficient of friction (hereinafter "COF"). For example, a reduction in film-to-film and film-to-metal friction can provide for easier feeding of film sheets into automatic converting and packaging equipment. Films with high COFs (low slip) are difficult to handle and tend to wrinkle leading to high converting losses.

As reported in *Cyclic-olefinic Copolymers as Non-Migrating, Polymeric Slip Additives in LDPE and LLDPE Cast Films* by David R. Constant of Ticona LLC 2002 *PLACE Conference Proceedings (Conference Papers)*] there are a large number of options for slip additives including COPs, but that all slip additives "seem to come with compromises, however, generally in film clarity or cost". It is further mentioned that although COPs have a significant effect on COF. of the films, that effect is also associated with an increase in surface haze.

An object of the present invention is to provide a polyethylene composition and film for packaging applications that have low COFs (static and dynamic) as well as superior optical properties. It is a further object of the present invention to provide a method for making a polyethylene film having surfaces with low COFs and haze values.

SUMMARY OF THE INVENTION

It has been found in accordance with the invention that polyethylene films with superior slip properties and low haze can be made by melt-blending COP of a weight average molecular weight of from about 0.5 to about 50 kg/mol. Films made from the inventive compositions may be used as monolayer films or as an outer layer of a multilayer film. There is thus provided in accordance with the invention a melt-blended polyethylene/COP composition suitable for making optically clear films with low coefficients of friction including from about 70 weight percent to about 98 weight percent of a polyethylene resin and from about 2 weight percent to about 25 weight percent of a first COP resin component, the first COP resin component having a weight average molecular weight of from about 0.5 kg/mol to about 50 kg/mol and being present in an amount effective to increase the relative slip value of films made from the composition as compared with a like film made from the polyethylene resin. Preferably, the first COP resin component has a weight average molecular weight of from about 1 kg/mol to about 35 kg/mol and still more preferably the first COP resin component has a weight average molecular weight of from about 2 kg/mol to about 35 kg/mol.

Generally, the first COP resin component is present in an amount of from about 5 weight percent to about 25 weight percent. In some preferred embodiments, the first COP resin component is present in an amount of from about 10 to about 20 weight percent. Optionally, there is provided a second COP resin component having a molecular weight higher than the molecular weight of the first COP resin component. Perhaps most preferably, the first COP resin component comprises an ethylene/norbornene copolymer, wherein the ethylene/norbornene copolymer is from about 25 mol % to about 40 mol % ethylene and from about 75 mol % to about 60 mol % norbornene.

Typically, a film made from the composition exhibits a relative slip value of at least about 1.5 and a relative haze index of less than 2.5. More preferably, a film made from the composition exhibits a relative slip value of at least about 2.5 and a relative haze index of less than 2.5. Relative slip values of at least about 3, 5, 10 or more are readily achieved in accordance with the invention. Likewise, a relative haze index of less than about 2 can be maintained if so desired.

Another aspect of the invention is a method of making an optically clear, low friction polyethylene film including: (a) melt-blending a composition comprising from about 70 to about 98 weight percent of a polyethylene resin and from about 2 to about 25 weight percent of a first COP resin component, the first COP resin component having a weight average molecular weight of from about 0.5 kg/mol to about 50 kg/mol and being present in an amount effective to increase the relative slip value of films made from the composition as compared with a like film consisting essentially of the polyethylene resin; and (b) extruding the melt-blend into a film. In many instances, the blend is provided in the form of pellets prior to extruding the composition into a packaging film. The compositions may be extruded into a film at melt temperatures of from about 200° C. to about 300° C. such as at temperatures of from about 230° C. to about 270° C. Films so made may have thicknesses of from about 0.01 mm to about 0.1 mm.

Any suitable polyethylene resin may be used, such as commercially available LDPE or LLDPE resins having a melt index of from about 1 g/10 min. to about 7 g/10 min.

Further features and advantages of the invention will become apparent from the discussion which follows.

BRIEF DESCRIPTION OF DRAWINGS

The file of this patent contains at least one drawing executed in color. Copies of this patent with color drawings(s) will be provided the Patent and Trademark Office upon request and payment of the necessary fee.

The invention is described in detail below with reference to the Figures wherein.

DETAILED DESCRIPTION OF THE INVENTION

Figure 1:
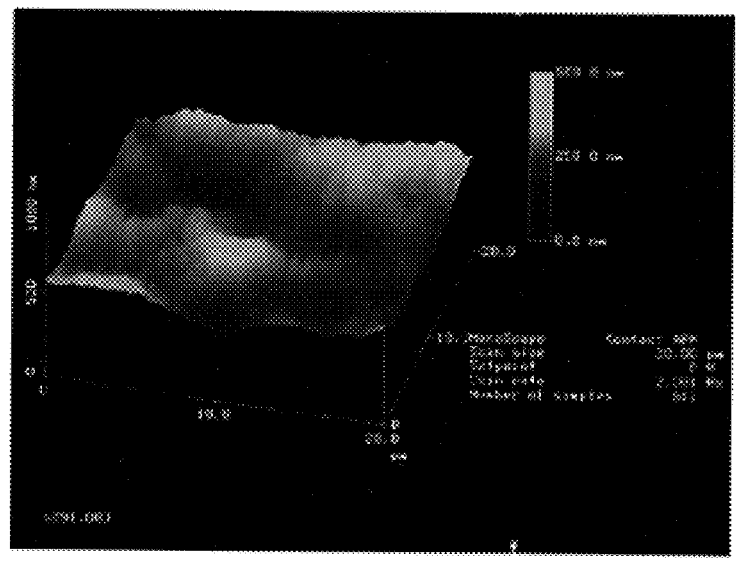
FIG. 1 is a surface photomicrograph of an LDPE film without a slip additive.

The invention is described in detail below with reference to numerous embodiments for purposes of exemplification and illustration only. Modifications to particular embodiments within the spirit and scope of the present invention, set forth in the appended claims, will be readily apparent to those of skill in the art.

Unless more specifically defined, terminology as used herein is given its ordinary meaning.

Molecular weight means weight average molecular weight as measured by GPC in chloroform @ 35° C. using narrow distribution polystyrene standards.

Percent means weight percent unless otherwise specified.

Relative Slip Value is a measure of the decrease of static and dynamic coefficients of friction with respect to a film of the polyethylene carrier resin alone. A relative slip value is calculated as follows:

$$\frac{\text{Static } COF \text{ of Reference Film} + \text{Kinetic } COF \text{ of Reference Film}}{\text{Static } COF \text{ of Sample} + \text{Kinetic } COF \text{ of Sample}}$$

By definition, the relative slip value of a polyethylene resin is 1.0. Sample calculations appear in Table 2.

Relative Haze Index is the ratio of haze value of a specimen film divided by the haze value of a reference film of like thickness of the carrier polyethylene resin alone. An increase in this parameter indicates a deterioration of optical properties. Sample calculations appear in Table 2.

Unless otherwise specified, the following test methods are used:

| | |
|---|---|
| Static and Kinetic Coefficients of Friction | ASTM D 1894-01 |
| Haze Values | ASTM D 1003-00 |
| Melt Index | ASTM D 1238 |
| Density | ASTM D 792 |
| Vicat Softening Point | ASTM D 1525 |
| Gloss (45°) | ASTM D 2457 |

If no year is specified, the test method in effect on Jul. 1, 2004 is presumed.

The term "polyethylene resin" as used herein means resins that consist predominantly of ethylene repeat units. Polyethylenes may contain olefinic comonomers as well. Non-limiting examples of suitable polyethylenes include low density polyethylene (LDPE), linear low density polyethylene (LLDPE), medium density polyethylene (MDPE) and high density polyethylene (HDPE). Some of the polyethylenes useful in accordance with this invention are referred to by terms such as LDPE, LLDPE, LMDPE, VLDPE, ULDPE, and the like. LDPE is a low density polyethylene homopolymer. Ethylene polymers generally have a density in the range of from about 0.86 g/cc to about 0.94 g/cc. The term linear low density polyethylene (LLDPE) is generally understood to include that group of ethylene resins which fall into the density range of about 0.915 to about 0.94 g/cc. Sometimes linear polyethylene in the density range from about 0.926 to about 0.94 g/cc is referred to as linear medium density polyethylene (LMDPE). Lower density ethylene copolymers may be referred to as very low density polyethylene (VLDPE, typically used to refer to the ethylene/butene copolymers available from Union Carbide with a density ranging from about 0.88 to about 0.91 g/cc) and ultra-low density polyethylene (ULDPE, typically used to refer to the ethylene/octene copolymers supplied by Dow Chemical Company). Particularly preferred are LDPE resins and LLDPE resins which have melt indexes from about 1 to about 7 g/10 min.

Additional characteristics of polyethylenes are described in Kirk-Othmer, *Encyclopedia of Chemical Technology*, Fourth Edition (1993), Volume 11, pp. 843-844, the disclosure of which is incorporated herein by reference.

Useful cycloolefin polymers and copolymers, collectively referred to herein as COPs or COP resins are known in the art. For example, U.S. Pat. No. 6,068,936 (Assignee: Ticona GmbH) and U.S. Pat. No. 5,912,070 (Assignee: Mitsui Chemicals, Inc.) disclose several cycloolefin polymers and copolymers, the disclosures of which are incorporated herein in their entirety by reference. These polymers are polymers of cyclo-olefin monomers or copolymers including cyclo-olefin monomers and acyclic olefin monomers, described further below.

Cyclo-olefins are mono- or polyunsaturated polycyclic ring systems, such as cycloalkenes, bicycloalkenes, tricycloalkenes or tetracycloalkenes. The ring systems can be monosubstituted or polysubstituted. Preference is given to cyclo-olefins of the formulae I, II, III, IV, V or VI, or a monocyclic olefin of the formula VII:

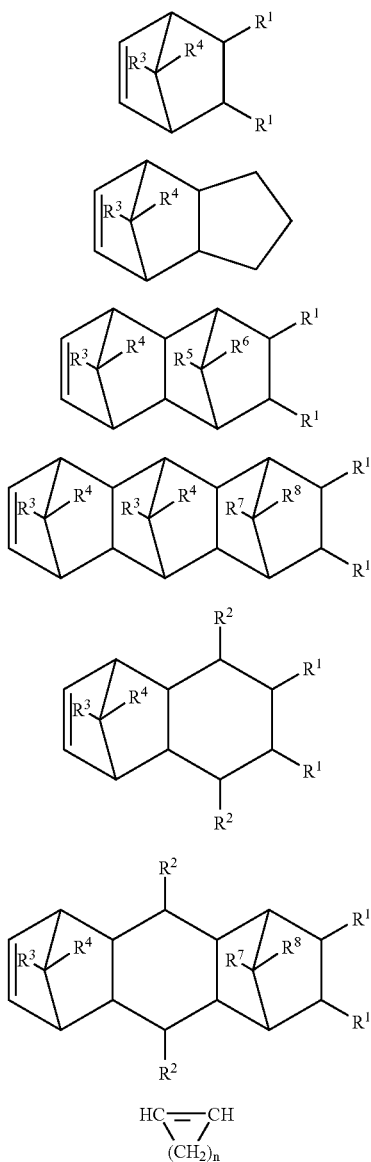

wherein $R^1$, $R^2$, $R^3$, $R^4$, $R^5$, $R^6$, $R^7$ and $R^8$ are the same or different and are H, a $C_6$-$C_{20}$-aryl or $C_1$-$C_{20}$-alkyl radical or a halogen atom, and n is a number from 2 to 10. Examples of such cyclic olefin monomers are norbornene, dimethyl-octahydro-naphthalene, cyclopentene and (5-methyl)norbornene and the like, or mixtures thereof. These monomers can be made into homopolymer COP or polymerized with acyclic comonomers. Examples of suitable acyclic olefin monomers which may be polymerized with the cyclo-olefins noted above are ethylene, propylene, butylene and the like, or mixtures thereof. A preferred cyclic olefin is norbornene, and a preferred acyclic olefin for reaction therewith is ethylene.

The cycloolefin polymers can be prepared with the aid of transition-metal catalysts, e.g. metallocenes. Suitable preparation processes are known and described, for example, in DD-A-109 225, EP-A-0 407 870, EP-A-0 485 893, U.S. Pat. Nos. 6,489,016, 6,008,298, 6,608,936, and 5,912,070, the disclosures of which are incorporated herein in their entirety by reference. Molecular weight regulation during the preparation can advantageously be effected using hydrogen. Suitable molecular weights can also be established through targeted selection of the catalyst and reaction conditions. Details in this respect are given in the abovementioned specifications.

Low molecular weight COPs which are suitable for purposes of the present invention generally have a weight average molecular weight $M_w$ of from about 0.5 to 50 kg/mol, typically a weight average molecular weight of from about 1 or 2 kg/mol to about 35 kg/mol as measured by GPC @ 35° C. in chloroform using narrowly distributed polystyrene standards. A typical resin composition has a polydispersity $M_w/M_n$ of 2-2.4 A Tg of between about 50° C. and 90° C. (half height DSC 20° C./min, second heating) is typical of COPs which may be used in the inventive compositions.

Higher molecular weight COPs can be used with the lower molecular weight resins in combination as is seen in the data below.

The compositions of the invention are melt-blended in an extruder at a melt temperature of anywhere from about 200° C. to 300° C. and may be pelletized or extruded directly into film form.

In order to further improve certain properties of the invention, the polyethylene composition and films can contain additives in effective amounts in each case. Preferred additives may include polymer-compatible low-molecular-weight hydrocarbon resins and/or antistatics and/or lubricants and/or stabilizers and/or neutralizers. All amounts given below in percent by weight (% by weight) and in each case relate to the layer or layers to which the additive can be added.

Low-molecular-weight resins can be added in order further to improve the desired physical properties (for example film rigidity, shrinkage, optical properties, water vapor permeability (WVP)). If desirable, hydrocarbon resins can be added to the low COF film. Antistatics that can be used are alkali metal alkanesulfonates, polyether-modified, i.e. ethoxylated and/or propoxylated polydiorganosiloxanes (polydialkylsiloxanes, polyalkylphenylsiloxanes and the like) and/or the essentially straight-chain and saturated aliphatic, tertiary amines containing an aliphatic radical having 10 to 20 carbon atoms which are substituted by Ω-hydroxy-($C_1$-$C_4$)-alkyl groups, where N,N-bis-(2-hydroxyethyl)alkylamines having 10 to 20 carbon atoms, preferably 12 to 18 carbon atoms, in the alkyl radical are particularly suitable. The effective amount of antistatic is in the range from 0.05 to 0.3% by weight. Lubricants which may be added include higher aliphatic acid amides, higher aliphatic acid esters, waxes and metal soaps and polydimethylsiloxanes. The effective amount of lubricant is in the range from 0.1 to 3% by weight. The addition of higher aliphatic acid amides in the range from 0.15 to 0.25% by weight to the base layer and/or the outer layers is particularly suitable. A particularly suitable aliphatic acid amide is erucamide. The addition of polydimethylsiloxanes is preferred in the range from 0.3 to 2.0% by weight, in particular polydimethylsiloxanes having a viscosity of from 10,000 to 1,000,000 mm$^2$/s. Stabilizers which can be employed are the conventional stabilizing compounds for polymers of ethylene, propylene and other α-olefins. The amount in which they are added is between 0.05 and 2% by weight. Phenolic stabilizers, alkali metal/alkaline earth metal stearates and/or alkali metal/alkaline earth metal carbonates are particularly suitable. Phenolic stabilizers are preferred in an amount of from 0.1 to 0.6% by weight, in particular from 0.15 to 0.3% by weight, and with a molar mass of greater than 500 g/mol. Pentaerythrityl tetrakis[3-(3,5-di-tert-butyl-4-hydroxyphenyl)propionate] or 1,3,5-trimethyl-2,4,6-tris(3,5-di-tert-butyl-4-hydroxybenzyl)benzene are particularly advantageous.

Films are suitably prepared by way of flat die technique described in Kirk-Othmer, *Encyclopedia of Chemical Technology*, Fourth Edition (1993), Volume 10, pp. 775-778, the disclosure of which is incorporated herein by reference. The simplest form of melt extrusion is the use of a slot die to form the molten polymer into a thin flat profile which is then quenched immediately to a solid state. This is usually done by contacting the hot web very quickly on a chilled roll or drum. A liquid quenching bath may be used in place of or contiguous to the chill roll. In some cases, the web may be drawn down in thickness by overdriving the quenching roll relative to the extrusion velocity. The most important factor in the slot-film process is the design of the die. The control of transverse gauge is important and typically requires some form of cross-web gauge adjustment. Mechanical alternation of the die gap across the web may be done by using precisely controlled bolt action on the die lips, or by controlled application of heat in small increments across the die. Interior die geometry must be carefully designed to accommodate the flow and shear characteristics of the particular composition being used. Care must be taken to prevent melt fracture by adjusting die characteristics to extrusion rate, drawdown, viscosity, and temperature as one of skill in the art will appreciate.

Films of the invention can be laminated to or coextruded with other thermoplastic layers. The polymers for such additional layers can be selected from the group consisting of polyolefin, polyamide, polyester, polyamide (including nylon), polyketone, polyketoamide, polycarbonate, ethylene/vinyl alcohol copolymer (EVOH), polyurethane, polyether, polyvinyl, polypropylene, cyclic olefin homopolymer and cyclic olefin copolymer and combinations thereof. Examples of suitable polymers are poly (m-xylene-adipamide) (MXD6), poly(hexamethylenesebacamide), poly(hexamethylene-adipamide) and poly(-caprolactam), polyesters such as poly(ethylene terephthalate) and polybutylene terphthalate, polyurethanes, polyacrylonitriles, ethylene vinyl alcohol copolymers, ethylene vinyl acetate copolymers, polyesters grafted with maleic anhydride, PVdC, aliphatic polyketone, and LCP (liquid crystalline polymers). A suitable polyketone is exemplified by Carillon®, which is produced by Shell. A suitable liquid crystalline polymer is exemplified by Vectra®, which is produced by Ticona. So also, the films may be monolayer stand-alone films or films affixed to any suitable additional layer.

The invention is described in detail below by reference to the various examples. Such illustration is for purposes of description only and is not limitative of the invention, the spirit and scope of which appears in the appended claims. Unless otherwise indicated, terms are to be construed in accordance with their ordinary meaning. Many variations of the present invention will occur to those skilled in the art. The present invention is not limited to the embodiments illustrated and described herein, but encompasses all the subject matter within the scope of the appended claims.

EXAMPLES

A series of 2 micron thick films were melt-extruded using melt temperatures of from about 200° C.-275° C. using the following ingredients:

LDPE (A)—Equistar NA-204-000 LDPE resin having the following properties:

| Property | Value | Units | ASTM Test Method |
|---|---|---|---|
| Melt Index | 7.0 | g/10 min | D 1238 |
| Density | 0.918 | g/cc | D 1505 |
| Tensile Strength | 1.700 | Psi | D 638 |
| Elongation | 550 | % | D 638 |
| Flexural Stiffness | 30,000 | Psi | D 790 |
| Vicat Softening Point | 84 | ° C. | D 1525 |

LDPE (B)—Marflex PE resin PE 4517. This LDPE resin has a melt index of 5 g/$^{10}$ min and a density of 0.923 g/cc.

LLDPE—Dowlex 2045, which has the following properties:

| Property | Test Method | Values English (SI) |
|---|---|---|
| Melt Index, g/10 min | ASTM D 1238 | 1.0 |
| Density, g/cc | ASTM D 792 | 0.9200 |
| DSC Melting Point, ° F. (° C.) | Dow Method | 252 (122) |
| Vicat Softening Point, ° F. (° C.) | ASTMD 1525 | 226 (108) |

Topas 5013 COP resin having the following properties:

| Thermal Properties | Value Unit | Test Standard |
|---|---|---|
| Glass transition temperature (10° C./min) | 136° C. | ISO 11357-1, -2, -3 |
| Temp. of deflection under load (1.80 MPa) | 116° C. | ISO 75-1/-2 |
| Temp. of deflection under load (0.45 MPa) | 127° C. | ISO 75-1/-2 |
| Vicat softening temperature (50° C./h 50N) | 135° C. | ISO 306 |

This resin has a weight average molecular weight in the range of about 70 to 130 kg/mol as measured chloroform, 35° C. as noted above.

Topas 8007 COP resin having the following properties:

| Thermal Properties | Value Unit | Test Standard |
|---|---|---|
| Glass transition temperature (10° C./min) | 80° C. | ISO 11357-1, -2, -3 |
| Temp. of deflection under load (1.80 MPa) | 68° | ISO 75-1/-2 |
| Temp. of deflection under load (0.45 MPa) | 75° C. | ISO 75-1/-2 |
| Vicat softening temperature (50° C./h 50N) | 80° C. | ISO 306 |

This resin also has a weight average molecular weight in the range of about 70 to 130 kg/mol as measured chloroform, 35° C. as noted above.

Topas toner, low molecular weight COP resin having the following properties: a weight average molecular weight $M_w$ of from about 0.5 to 50 kg/mol, typically a weight average molecular weight of from about 1 or 2 kg/mol to about 35 kg/mol as measured by GPC @ 35° C. in chloroform using narrowly distributed polystyrene standards. A typical resin composition has a polydispersity $M_w/M_n$ of 2-2.4 A Tg of between about 50° C. and 90° C. (half height DSC 20° C./min, second heating) is typical of COPs which may be used in the inventive compositions. A Tg of from about 60° C. to about 75° C. is perhaps most preferred.

$M_w$—weight average molecular weight of from 2 kg/mol to 35 kg/mol. Glass transition 50-90° C.

The ingredients were made into film or melt-blended in the proportions listed in Table 1 and then made into film. The compositions of Table 1 were extruded into 2 micron films and evaluated for haze in accordance with test method ASTM D 1003-00. The specimens were also evaluated for coefficients of friction, both static and dynamic in accordance with test method ASTM D 1894-01. Results appear in Table 2. There is also reported in Table 2 the relative haze index and the relative slip value for purposes of comparing the inventive compositions to films made from the same polyethylene resin.

TABLE 1

| | Test Compositions | |
|---|---|---|
| Example | LDPE | COP |
| LDPE (A) | 100% Equistar NA 204-00 | — |
| 1 | 90% Equistar NA 204-00 | 10% Topas ® Toner TM |
| LDPE (B) | 100% Chevron LDPE 4517 | — |
| Ref. A | 90% Chevron LDPE 4517 | 10% Topas ® 8007 |
| 2 | 95% Chevron LDPE 4517 | 5% Topas ® Toner TM |
| 3 | 90% Chevron LDPE 4517 | 10% Topas ® Toner TM |
| Ref. B | 85% Chevron LDPE 4517 | 15% Topas ® 8007 |
| Ref. C | 75% Chevron LDPE 4517 | 25% Topas ® 8007 |
| 4 | 85% Chevron LDPE 4517 | 15% Topas ® Toner Tm |
| 5 | 75% Chevron LDPE 4517 | 25% Topas ® Toner TM |
| 6 | 85% Chevron LDPE 4517 | 10% Topas ® 8007; 5% Topas ® Toner TM |
| 7 | 85% Chevron LDPE | 5% Topas ® 8007; 10% Topas ® Toner TM |
| LLDPE | 100% Dowlex 2045 (LLDPE) | — |
| Ref. D | 80% Dowlex 2045 (LLDPE) | 20% Topas ® 8007 |
| Ref. E | 80% Dowlex 2045 (LLDPE) | 20% Topas ® 5013 |
| 8 | 90% Dowlex 2045 (LLDPE) | 10% Topas ® Toner TM |

TABLE 2

Composite Optical and Slip Properties of Films

| Example | Static COF | Dynamic COF | Haze | Relative Slip Value | Relative Haze Index | Specular Gloss |
|---|---|---|---|---|---|---|
| LDPE (A) | 1.85 | 1.60 | 14 | 1.0 | 1.0 | 28 |
| 1 | 0.73 | 0.48 | 14 | 2.85 | 1.0 | 27 |
| LDPE (B) | 2.17 | 1.34 | 6.7 | 1.0 | 1.0 | 29 |
| Ref. A | 1.23 | 1.03 | 7 | 1.57 | 1.05 | 41 |
| 2 | 1.21 | 1.03 | 6 | 1.55 | 0.90 | 33 |
| 3 | 0.63 | 0.55 | 6 | 2.97 | 0.9 | 37 |
| Ref. B | 1.55 | 1.1 | 6.9 | 1.32 | 1.03 | 45 |
| Ref. C | 0.65 | 0.52 | 11.8 | 3 | 1.76 | 44 |
| 4 | 0.64 | 0.5 | 6.1 | 3.08 | 0.87 | 44 |
| 5 | 0.87 | 0.73 | 11.3 | 2.19 | 1.61 | 50 |
| 6 | 0.59 | 0.57 | 6.3 | 3.02 | 0.90 | 55 |
| 7 | 0.55 | 0.52 | 6.4 | 3.28 | 0.91 | 58 |
| LLDPE | 7 | 20.0 | 2 | 1.0 | 1.0 | — |
| Ref. D | 1.54 | 1.31 | 6 | 9.47 | 3 | — |
| Ref. E | 0.78 | 0.8 | 38 | 17.09 | 19 | — |
| 8 | 1.22 | 0.72 | 4.33 | 13.92 | 2.1 | 43 |

The invention is appreciated by comparison of LDPE (A) with Example 1 which is the same LDPE with 10% low molecular weight COP. Here it is seen the haze remains unchanged, while the slip increases nearly 300%.

It is also seen by comparison of LDPE (B), Reference example A and Examples 2 and 3 that while the higher molecular weight COP resin 8007 is effective to increase slip, that lower molecular weight toner resin is much more effective at the same levels and equally effective at half the level. The 8007 resin alone is not especially effective in these samples until a relatively high amount (25%) is used to the detriment of optical properties. See Reference example C. It is also noted that the toner resin is very effective at levels of 5 weight percent and 10 weight percent when used in combination with a second COP resin of higher molecular weight.

In the LLDPE series of films evaluated, higher molecular weight resins increased slip; however, haze values increased much more than with the toner resin.

Figure 2:
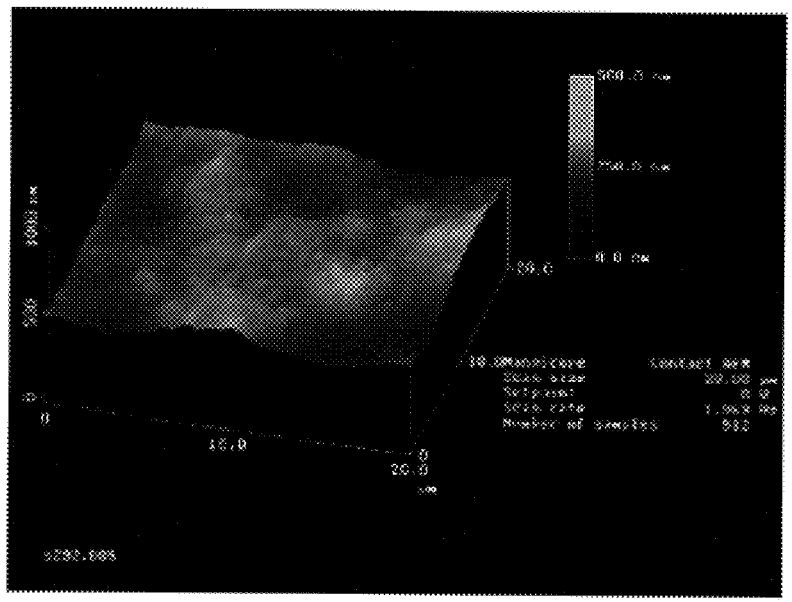
FIG. 2 is a surface photomicrograph of an LDPE film with 15% of a high molecular weight COP added to the LDPE of FIG. 1.

The invention is further appreciated by reference to the appended photomicrographs. FIG. 1 is a photomicrograph showing the surface of a film of commercially available LDPE extruded into film form, without a slip additive. The surface is relatively smooth, indicative of films with relative high coefficients of friction. FIG. 2 is a film of the LDPE of FIG. 1 blended with 15% of a high molecular weight COP.

Figure 3:
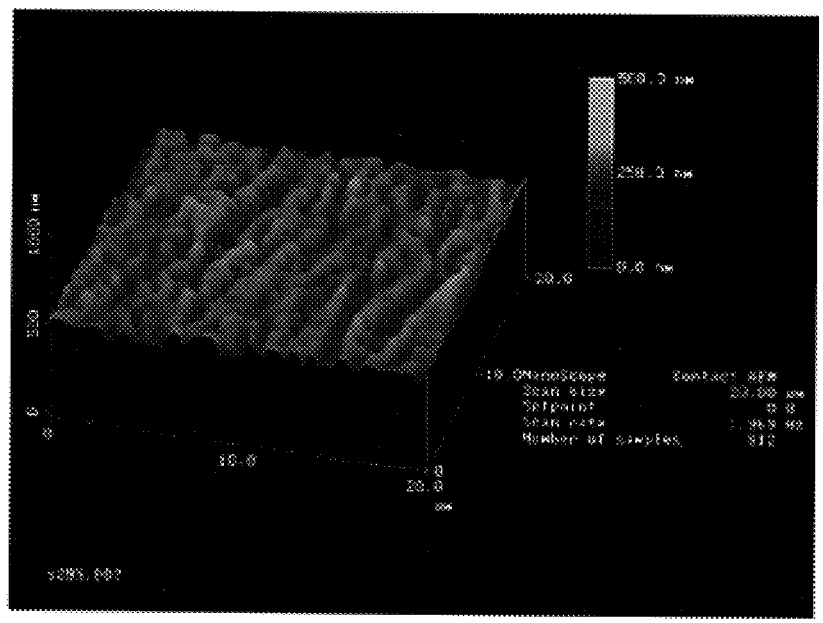
FIG. 3 is a surface photomicrograph of an LDPE of an invention blend including 15% low molecular weight COP.

Here it is seen the surface roughness increases somewhat, consistent with the observed lowering of the friction coefficients with respect to LDPE alone. Additionally the roughness is of a large scale irregular form which increases surface light scattering and therefore increases haze. In FIG. 3 there is shown the surface of a film made from a melt blend of the invention using the same LDPE of FIGS. 1 and 2 and 15% low molecular weight COP. Here there is seen a dramatic increase in surface roughness, consistent with the large decreases in coefficients of friction observed with the melt blends of the invention. The roughness in this case is of a very uniform small scale which does not scatter light or increase haze.

While the invention has been described in connection with several examples, modifications to those examples within the spirit and scope of the invention will be readily apparent to those of skill in the art. In view of the foregoing discussion, relevant knowledge in the art and references including patents and publications discussed above in connection with the Background and Detailed Description, the disclosures of which are all incorporated herein by reference, further description is deemed unnecessary.

What is claimed is:

1. A film extruded from a melt-blended polyethylene/COP composition, said composition comprising from about 70 weight percent to about 98 weight percent of a polyethylene resin which is selected from LDPE, LLDPE and combinations thereof, and from about 2 weight percent to about 25 weight percent of a first COP resin component, the first COP resin component having a weight average molecular weight of from about 0.5 kg/mol to about 50 kg/mol and a glass transition temperature in the range of from 50° C. to 90° C., and said COP resin including cycloolefin monomer and acyclic olefin comonomer, wherein the composition is melt-blended and extruded at temperatures such that the film exhibits a relative slip value of at least about 1.5 and a relative haze index of less than about 2.5.

2. The film according to claim 1, wherein the first COP resin component has a weight average molecular weight of from about 1 kg/mol to about 35 kg/mol.

3. The film according to claim 1, wherein the first COP resin component has a weight average molecular weight of from about 2 kg/mol to about 35 kg/mol.

4. The film according to claim 1, wherein the first COP resin component is present in an amount of from about 5 weight percent to about 25 weight percent.

5. The film according to claim 1, wherein the first COP resin component is present in an amount of from about 10 to about 20 weight percent.

6. The film according to claim 1, wherein the polyethylene/COP composition further comprises a second COP resin component having a molecular weight higher than the molecular weight of the first COP resin component.

7. The film according to claim 1, wherein the first COP resin component comprises an ethylene/norbornene copolymer.

8. The film to claim 7, wherein the ethylene/norbornene copolymer is from about 25 mol % to about 40 mol % ethylene and from about 75 mol % to about 60 mol % norbornene.

9. The film according to claim 1, wherein the film exhibits a relative slip value of at least about 2.5 and a relative haze index of less than 2.5.

10. The film according to claim 1, wherein the film exhibits a relative slip value of at least about 3 and a relative haze index of less than 2.5.

11. The film according to claim 1, wherein the film exhibits a relative slip value of at least about 5 and a relative haze index of less than 2.5.

12. The film according to claim 1, wherein the film exhibits a relative slip value of at least about 10 and a relative haze index of less than 2.5.

13. The film according to claim 1, wherein the film exhibits a relative haze index of less than about 2.

14. A method of making an optically clear, low friction polyethylene film comprising:
   a) melt-blending a composition comprising from about 70 to about 98 weight percent of a polyethylene resin which is selected from LDPE, LLDPE, and combinations thereof, from about 2 to about 25 weight percent of a first COP resin component, the first COP resin component having a weight average molecular weight of from about 0.5 kg/mol to about 50 kg/mol and a glass transition temperature of from 50° C. to 90° C. and being present in an amount effective to increase the relative slip value of films made from the composition as compared with a like film consisting essentially of the polyethylene resin, wherein the COP resin includes cycloolefin monomer and acyclic olefin comonomer, where the acyclic olefin comonomer is present in the COP resin in amounts of from about 25 to about 40 mole percent; and
   b) extruding the melt-blend into a film.

15. The method according to claim 14, further comprising the step of pelletizing the melt blend prior to extruding the melt blend into a film.

16. The method according to claim 14, wherein the melt blend is extruded into a film at a temperature of from about 225° C. to about 300° C.

17. The method according to claim 14, wherein the melt blend is extruded into a film at a temperature of from about 230° C. to about 270° C.

18. The method according to claim 14, wherein the film has a thickness of from about 0.01 mm to about 0.1 mm.

19. The method according to claim 14, wherein the polyethylene resin has a melt index of from about 1 g/10 min. to about 7 g/10 min.

20. A film extruded from a melt-blended polyethylene/COP composition, said composition comprising from about 70 weight percent to about 98 weight percent of a polyethylene resin selected from LDPE, LLDPE, or combinations thereof, and from about 2 weight percent to about 25 weight percent of a COP resin component, the COP resin component comprising a COP copolymer including recurring ethylene and norbornene repeat units, and having a weight average molecular weight of from about 0.5 kg/mol to about 50 kg/mol, wherein said COP resin is present in the composition in an amount such that the film exhibits a relative slip value of at least about 1.5 and a relative haze index of less than about 2.5

21. The film according to claim 20, wherein the glass transition temperature is in the range of from 60° C. to 75° C.

* * * * *